US008086551B2

(12) United States Patent
Czora

(10) Patent No.: US 8,086,551 B2
(45) Date of Patent: Dec. 27, 2011

(54) ELECTRONIC SYSTEM WITH SIMULATED SENSE PERCEPTION AND METHOD OF PROVIDING SIMULATED SENSE PERCEPTION

(75) Inventor: Gregory J. Czora, Mariposa, CA (US)

(73) Assignee: Blue Oak Mountain Technologies, Inc., Las Vegas, NV (US)

( * ) Notice: Subject to any disclaimer, the term of this patent is extended or adjusted under 35 U.S.C. 154(b) by 890 days.

(21) Appl. No.: 12/148,141

(22) Filed: Apr. 16, 2008

(65) Prior Publication Data

US 2008/0294400 A1 Nov. 27, 2008

Related U.S. Application Data

(60) Provisional application No. 60/923,713, filed on Apr. 16, 2007.

(51) Int. Cl.
*G06F 17/00* (2006.01)
*G06N 5/02* (2006.01)

(52) U.S. Cl. .......................................... 706/46
(58) Field of Classification Search ................ None
See application file for complete search history.

(56) References Cited

U.S. PATENT DOCUMENTS

| 4,903,201 | A | 2/1990 | Wagner |
| 5,557,517 | A | 9/1996 | Daughterty, III |
| 5,572,646 | A | 11/1996 | Kawai et al. |
| 5,592,375 | A | 1/1997 | Salmon et al. |
| 5,640,569 | A | 6/1997 | Miller et al. |
| 5,715,402 | A | 2/1998 | Popolo |
| 5,754,740 | A | 5/1998 | Fukuoka et al. |
| 5,794,207 | A | 8/1998 | Walker et al. |
| 5,797,127 | A | 8/1998 | Walker et al. |
| 5,802,296 | A | 9/1998 | Morse et al. |
| 5,835,896 | A | 11/1998 | Fisher et al. |
| 5,857,176 | A | 1/1999 | Ginsberg |

(Continued)

FOREIGN PATENT DOCUMENTS

JP 411085005 A 3/1999

(Continued)

OTHER PUBLICATIONS

'Kismet Loves People': Whynott, Discover magazine Oct. 1999, pp. 67-73.*

(Continued)

*Primary Examiner* — Omar Fernandez Rivas
*Assistant Examiner* — Peter Coughlan
(74) *Attorney, Agent, or Firm* — Henneman & Associates, PLC; Larry E. Henneman, Jr.

(57) ABSTRACT

A method of providing sense perception to an electronic system includes capturing a plurality of data sets, each data set representing an observation of a scene from a different perspective, comparing the data sets to identify invariants in the data sets, comparing the invariants to identify objects including the invariants, comparing the identified invariants and objects to other identified invariants and objects to identify additional objects including invariants not yet included in previously identified objects, and outputting data indicative of the identified objects and invariants. The different perspectives can be temporal (e.g., time sequenced), positional (e.g., movement of sensors), etc. The data sets can include data indicative of optical images, sound, and/or any other type of sensory data. The invariants can be data representations of color patches in an optical image. The data sets can include data indicative of at least three different types of sense perceptions.

39 Claims, 7 Drawing Sheets

U.S. PATENT DOCUMENTS

| | | | |
|---|---|---|---|
| 5,966,526 | A | 10/1999 | Yokoi |
| 5,971,855 | A | 10/1999 | Ng |
| 5,982,372 | A | 11/1999 | Brush, II et al. |
| 5,983,003 | A | 11/1999 | Lection et al. |
| 6,009,460 | A | 12/1999 | Ohno et al. |
| 6,131,087 | A | 10/2000 | Luke et al. |
| 6,141,653 | A | 10/2000 | Conklin et al. |
| 6,154,211 | A | 11/2000 | Kamachi et al. |
| 6,253,167 | B1 | 6/2001 | Matsuda et al. |
| 6,268,872 | B1 | 7/2001 | Matsuda et al. |
| 6,449,518 | B1 | 9/2002 | Yokoo et al. |
| 6,459,955 | B1 | 10/2002 | Bartsch et al. |
| 6,522,951 | B2 | 2/2003 | Born et al. |
| 6,529,614 | B1 * | 3/2003 | Chao et al. ............. 382/103 |
| 6,651,044 | B1 | 11/2003 | Stoneman |
| 6,697,707 | B2 | 2/2004 | Peters, II |
| 6,718,533 | B1 | 4/2004 | Schneider et al. |
| 6,804,580 | B1 | 10/2004 | Stoddard et al. |
| 6,809,490 | B2 | 10/2004 | Jones et al. |
| 6,816,753 | B2 | 11/2004 | Sakamoto et al. |
| 6,865,429 | B1 | 3/2005 | Schneider et al. |
| 6,904,335 | B2 | 6/2005 | Solomon |
| 7,069,100 | B2 | 6/2006 | Monette et al. |
| 7,173,391 | B2 | 2/2007 | Jones et al. |
| 7,187,998 | B2 | 3/2007 | Okamoto et al. |
| 7,187,999 | B2 | 3/2007 | Okamoto et al. |
| 7,191,035 | B2 | 3/2007 | Okamoto et al. |
| 7,206,668 | B2 | 4/2007 | Okamoto et al. |
| 7,209,803 | B2 | 4/2007 | Okamoto et al. |
| 7,211,980 | B1 | 5/2007 | Bruemmer et al. |
| 7,252,644 | B2 | 8/2007 | Dewald et al. |
| 7,257,237 | B1 | 8/2007 | Luck et al. |
| 7,275,237 | B1 | 9/2007 | Schneider et al. |
| 7,286,888 | B2 | 10/2007 | Monette et al. |
| 7,295,892 | B2 | 11/2007 | Herr et al. |
| 7,312,766 | B1 | 12/2007 | Edwards |
| 7,343,222 | B2 | 3/2008 | Solomon |
| 7,388,343 | B2 | 6/2008 | Jones et al. |
| 7,429,843 | B2 | 9/2008 | Jones et al. |
| 7,499,893 | B2 | 3/2009 | Czora |
| 7,516,129 | B2 | 4/2009 | Risberg et al. |
| 7,539,675 | B2 | 5/2009 | Risberg et al. |
| 7,643,025 | B2 | 1/2010 | Lange |
| 7,849,026 | B2 | 12/2010 | Czora |
| 2002/0138246 | A1 | 9/2002 | Czora |
| 2003/0088522 | A1 | 5/2003 | Czora |
| 2005/0055298 | A1 | 3/2005 | Czora |
| 2006/0142986 | A1 | 6/2006 | Czora |
| 2010/0042319 | A1 * | 2/2010 | Wu et al. ............. 701/207 |

FOREIGN PATENT DOCUMENTS

| | | |
|---|---|---|
| WO | WO 02/073428 A1 | 9/2002 |

OTHER PUBLICATIONS

'Elements of artificial neural networks': Mehrotra, MIT press 1997.*

*Artificial Animals for Computer Animation: Biomechanics, Locomotion, Perception, amd Behavior*: Xiaoyuan Tu; Graduate Department of Computer Science; University of Toronto; 1996.

*Artificial Animals in Virtual Ecosystems*; Heleno et al.; Computer Networks and ISDN Systems; vol. 30, Issues 20-21; Nov. 1998; pp. 1923-1932.

*Artificial Life and Evolutionary Computing in Machine Perception*; Huedin JC; Proceedings of CAMP, IEEE 1995; pp. 418-428.

*Artificial Life for Computer Graphics*; Terzopoulos, D.; Communications of the ACM; vol. 42, Issue 8; Aug. 1999.

*Artificial Intelligence (Third Edition)*; Winston, Patrick H.; book summary; http://www.ascent.com/books; (downloaded from internet on Jan. 17, 2002).

*Artificial Life Meets Entertainment: Lifelike Autonomous Agents*; Maes, Patti; MIT Media Lab; Cambridge, MA; (downloaded from internet on Jan. 17, 2002).

*Bayesian Position Estimation of an Industrial Robot Using Multiple Sensors*; Karlsson, R.; Control Applications; Proceedings of the 2004 IEEE International Conference on Control Applications; Sep. 2-4, 2004, pp. 303-308.

*Brief History of Artificial Intelligence*; Buchanan, Bruce G.; University of Pittsburg; (downloaded from internet on Jan. 17, 2002).

*Building Life-like "Conscious" Software Agents*; Franklin, Stan; Institute for Intelligent Systems and Department of Mathematical Sciences; University of Memphis; unknown publication date.

*Concepts of Cooperation in Artificial Life*; Thimbleby, Harold W. et al.; IEEE Transactions on Systems, Man, and Cybernetics; vol. 25, No. 7; Jul. 1995.

*Design on Measurement and Control System of Cleaning Robot Based on Sensor Array Detection*; Dai et al.; Control and Automation; ICCA 2007; IEEE International Conference on May 30, 2007-Jun. 1, 2007; pp. 1319-1322 (only Abstract available).

*Development of a Flexible Tactile Sensor System for a Humanoid Robot*; Kerpa, O. et al.; Intelligent Robots and Systems, IEEE/RSJ International Conference on; vol. 1; Oct. 27-31, 2003; pp. 1-6.

*Entertaining Agents: A Sociological Case Study*; Foner, Leonard N.; MIT Media Lab; First International Conference on Autonomous Agents; Marina del Ray, CA; 1997.

*Evolutionary Robotics: Exploiting the Full Power of Self-organization*, Nolfi, Stefano; Connection Science; vol. 10, Nos. 3-4; 1998; pp. 167-184.

*Experimental Industrial Robotics*; Nilsson, K. et al.; Design and Control; Proceedings of the $35^{th}$ IEEE vol. 4; Dec. 11-13, 1996; pp. 3904-3909 (only Abstract available).

*Hot Holiday Dolls 2000: Dolls for Children*; "About" website; obtained Jun. 30, 2004; 5 pages.

*How Learning and Evolution Interact: The Case of a Learning Task which Differs from the Evolutionary Task*; Nolfi, Stefano; Institute of Psychology, National Research Council; unknown publication date.

*Interactive Artificial Life Based on Behavior and Perception in a Virtual Environment*: Hyun Seung Yang et al.; Dept. of Computer Science, Korea Advanced Institute of Science and Technology; IEEE; 2000.

*LamBaDa: An Artificial Environment to Study the Interaction Between Evolution and Learning*; Marilla Oliveira et al.; Cento de Informatica e Sistemas da Universidade de Coimbra; IEEE; 1999.

*Let's browse: a collaborative browsing agent*; Lieberman et al.; Knowledge-Based Systems 12; 1999; pp. 427-431.

*Living Off the Land*; Hapgood, Fred; Smithsonian; pp. 20 and 22; Jul. 16, 2001.

*Logical* vs. *Analogical or Symbolic* vs. *Connectionist or Neat* vs. *Scruffy*; Minksy, Marvin; Artificial Intelligence at MIT; vol. 1; MIT Press; 1990.

*Hierarchical Temporal Memory, Concepts, Theory and Terminology*; Hawkins, et al.; Numenta, Inc.; 2006; (http://www.numenta.com).

*Modeling Cognition with Software Agents*; Franklin, Stan; Institute for Intelligent Systems, University of Memphis; unknown publication date.

*Motion Control of Robot Manipulators Under Sensor Failure*; Gu, J. et al.; Intelligent Control and Automation, Proceedings of the $3^{rd}$ World Congress on; vol. 1; Jun. 28-Jul. 2, 2000; pp. 73-78 (only Abstract available).

*Newton's Telecom Dictionary: The Official Dictionary of Telecommunications*, Newton, Harry; Pub Group West; 1999; p. 313 (web page only, full reference not available).

*Old Tricks, New Dogs: Ethology and Interactive Creatures*: Blumberg, Bruce M.; doctoral thesis in School of Architecture and Planning, MIT, Feb. 1997.

*Redefining Robots*; Trachtman, Paul, Smithsonian; Jul. 19, 2000; pp. 97-112.

*Rethinking Artificial Intelligence*: Winston, Patrick H.; MIT Artificial Intelligence Laboratory; Sep. 1997.

*Sensor-Based Robot Systems*; Harashima, F. et al.; Industrial Electronics, 1992; Proceedings of the IEEE International Symposium on vol. 1; May 25-29, 1992; pp. 10-19 (only Abstract available).

*The Dimensions of Context—Space*; Lenat, Doug; Cycorp; Oct. 28, 1998.

*The Structure, Design and Dynamics Analysis of an Autonomous Over-Obstacle Mobile Robot*; Furui, W. et al.; Industrial Technology, 2005, IEEE Conference on; Dec. 14-17, 2005, pp. 248-253.

*Towards an Architecture for Artificial Animated Creatures*, Garcia, Luiz-Marcos et al.; IEEE; 2000.

*Vision Based Intelligent Control for Mobile Robot*; Peng, G. et al., Intelligent Control and Automation, The Sixth World Congress on; vol. 2, Jun. 21-23, 2006; pp. 9124-9128, (only Abstract available).
U.S. Appl. No. 09/257,863, U.S. specification, claims and drawings as filed Mar. 2, 1999 (with filing receipt).
U.S. Appl. No. 09/257,863, Office Action dated May 8, 2001.
U.S. Appl. No. 09/257,863, Office Action Response dated Nov. 7, 2001.
U.S. Appl. No. 09/257,863, Office Action dated Apr. 5, 2002.
U.S. Appl. No. 09/257,863, Office Action Response dated Jun. 5, 2002.
U.S. Appl. No. 09/257,863, Advisory Action dated Jun. 28, 2002.
U.S. Appl. No. 09/257,863, Notice of Abandonment dated Nov. 13, 2002.
U.S. Appl. No. 10/266,171, Office Action dated Jun. 3, 2003.
U.S. Appl. No. 10/266,171, Office Action Response dated Dec. 3, 2003.
U.S. Appl. No. 10/266,171, Office Action dated Feb. 6, 2004.
U.S. Appl. No. 10/266,171, Office Action Response dated Jul. 6, 2004.
U.S. Appl. No. 10/266,171, Notice of Abandonment dated Sep. 7, 2004.
U.S. Appl. No. 10/885,477, Office Action dated Sep. 28, 2006.
U.S. Appl. No. 10/885 477, Notice of Abandonment dated Apr. 16, 2007.
U.S. Appl. No. 09/802,505, Office Action dated Jul. 16, 2004.
U.S. Appl. No. 09/802,505, Office Action Response dated Jan. 18, 2005.
U.S. Appl. No. 09/802,505, Office Action dated Jun. 6, 2005.
U.S. Appl. No. 09/802,505, Office Action Response dated Dec. 5, 2005.
U.S. Appl. No. 09/802,505, Notice of Abandonment dated Dec. 13, 2005.
PCT Application No. PCT/US2002/006938, International Search Report dated May 13, 2002.
PCT Application No. PCT/US2002/006938, Written Opinion dated Feb. 11, 2003.
PCT Application No. PCT/US2002/006938, International Preliminary Examination Report dated Jun. 3, 2003.
U.S. Appl. No. 11/294,622, Office Action dated Apr. 19, 2007.
U.S. Appl. No. 11/294,622, Office Action Response dated Oct. 19, 2007.
U.S. Appl. No. 11/294,622, Office Action dated Feb. 22, 2008.
U.S. Appl. No. 11/294,622, Office Action Response dated Aug. 22, 2008.
U.S. Appl. No. 11/294,622, Interview Summary dated Aug. 28, 2008.
U.S. Appl. No. 11/294,622, Notice of Allowance dated Oct. 24, 2008.
U.S. Appl. No. 12/380,474, Office Action dated Feb. 12, 2010.
U.S. Appl. No. 12/380,474, Office Action Response dated Jun. 14, 2010.
U.S. Appl. No. 12/380474, Notice of Allowance dated Jul. 19, 2010.
U.S. Appl. No. 12/928,199, Office Action dated Jan. 25, 2011.
U.S. Appl. No. 12/928,199, Office Action Response dated May 25, 2011.

* cited by examiner

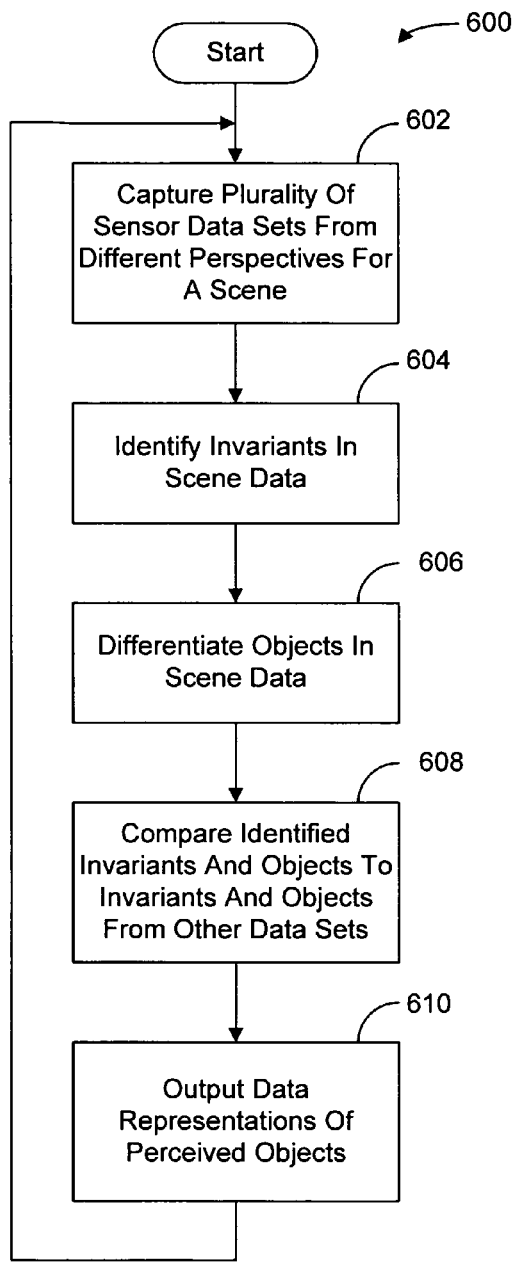
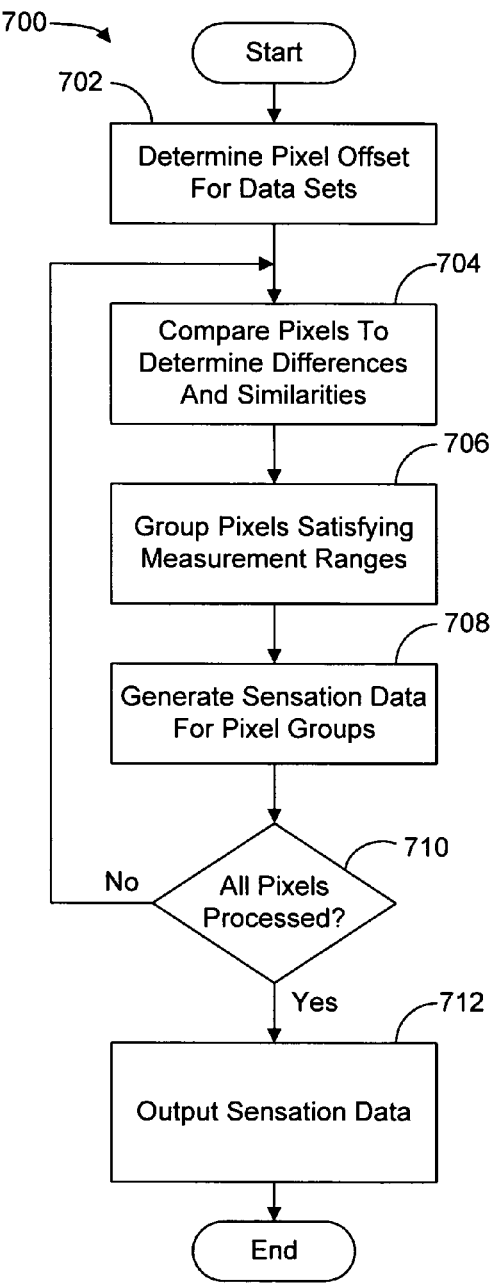
Fig. 6
Fig. 7

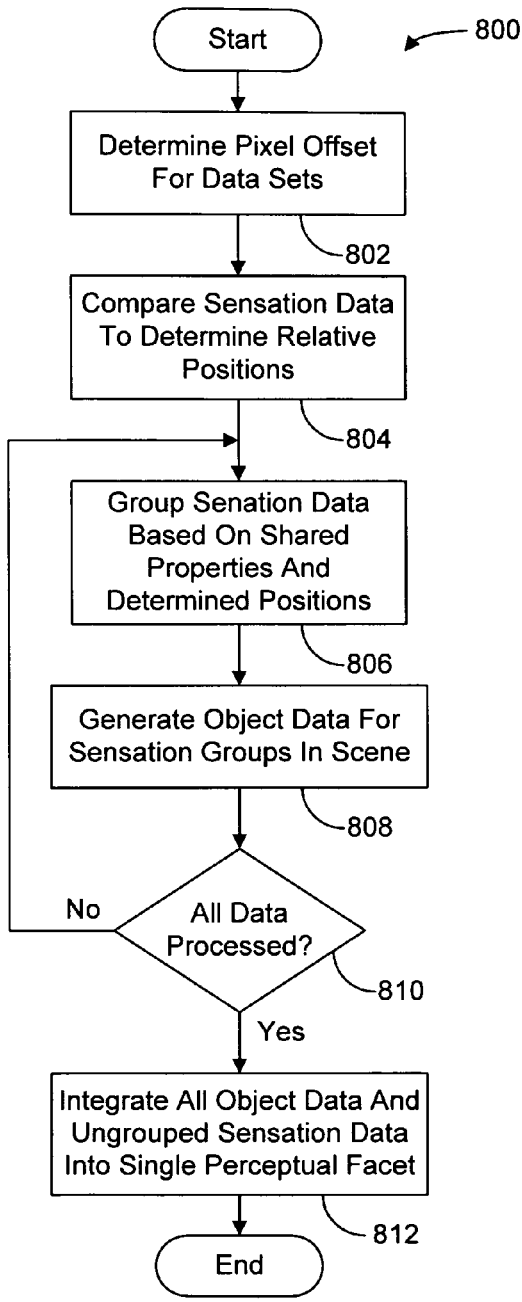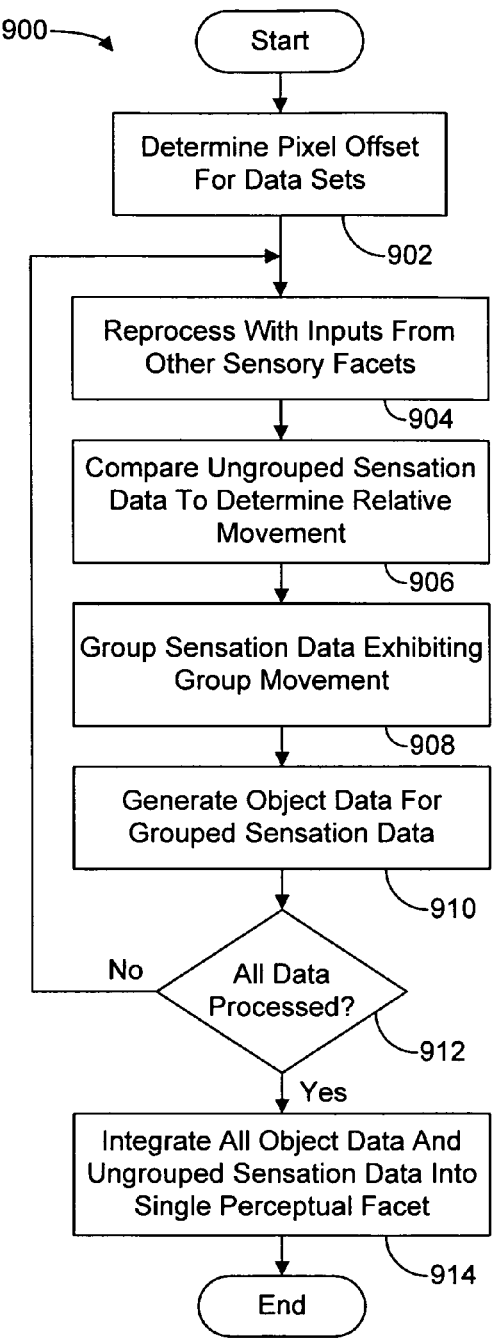
Fig. 8
Fig. 9

| RICX Level | Input | Output | Comments |
|---|---|---|---|
| Input | Light | CCD Pixels | CCD driver outputted pixels and other facets such as "sixels", "tixels", etc. |
| 1 | CCD Pixels and data from other types of sensors | IR-Pixels | Simulated sensations of color patches and patterns of other facets of reality included as additional property value pairs |
| 2 | IR-Pixels | IR-Pixels + O-Pixels | Simulated sensations + some simulated percepts of objects that include data from all sensed facets |
| 3 | IR-Pixels + O-Pixels + analogs from other senses | IR-Pixels + O-Pixels + IR, O-Pixel analogs integrations | Simulated percepts of objects resolved by motion and distance perspective, including property value pairs from other facets such as hearing and touch |

Fig. 10

ELECTRONIC SYSTEM WITH SIMULATED SENSE PERCEPTION AND METHOD OF PROVIDING SIMULATED SENSE PERCEPTION

RELATED APPLICATIONS

This application claims the benefit of U.S. Provisional Patent Application No. 60/923,713 entitled "Reality Identification Cortex Technology," filed Apr. 16, 2007 by the same inventor, which is incorporated herein by reference in its entirety.

BACKGROUND OF THE INVENTION

1. Field of the Invention

This invention relates generally to electronic systems designed to emulate human consciousness, and more particularly to a system and method of providing simulated sense perception to such systems.

2. Description of the Background Art

It is well known that most state of the art pattern recognition technology that could be used to simulate sense perception works only in very narrow domains. Because of this, there are many things humans find easy to do that computers are currently unable to do. Tasks such as visual pattern recognition, understanding spoken language, recognizing and manipulating objects by touch, and navigating in a complex world are easy for humans. Yet, despite decades of research, we have no viable algorithms for performing these and other cognitive functions on a computer.

An example of a developing technology that may be able to operate in somewhat wider domains is the Hierarchical Temporal Memory ("HTM") technology described in Hawkins, et., Hierarchical Temporal Memory, Concepts, Theory and Terminology, Numenta, Inc., 2006 (http://www.numenta.com). However, in HTM technology, the detection of novel input is still accomplished by a mechanistic process similar to pattern recognition, where new input is compared to a probability model of invariant representations of previously detected objects. HTM and other state of the art image processing technology produce probability models or mechanistically calculated invariants based on what their sensors sense in the world as anticipated by human programmers for whatever purposes the employers of the programmers had in mind, but they do not identify objects the way conscious life-forms do.

What is needed, therefore, is a system that can sense objects in an environment that has a greater degree of certainty than known systems. What is also needed is a system that simulates sense perception in a way that more closely resembles sense perception in animals. What is also needed is a system for simulating sense perception that is not limited by a programmer's anticipation of objects to be sensed by the system.

SUMMARY

The present invention overcomes the problems associated with the prior art by providing a system and method of sense perception that uses direct measurements of the world and mathematical techniques to identify objects and their relationships in their real world context, rather than by creating probability models. The invention provides a greater degree of certainty than other known systems. The invention also facilitates a significant reduction in the amount of data to be processed by storing the identity of objects in property/value data structures that are derived from the original measurements that produced them. Rather than forming invariant representations of objects, the invention limits the variation to a detected measurement range, thereby reducing the number of units to be processed in order to make object identification easier and more efficient.

A method of providing sense perception to an electronic system is disclosed. The method includes capturing a plurality of data sets, each data set representing an observation of a scene from a different perspective, comparing the data sets to one another to identify invariants in the data sets, comparing the invariants of the data sets to identify objects including the invariants, and outputting data indicative of the identified objects and invariants. The different perspectives can be temporal (e.g., time sequenced), positional (e.g., movement of sensors), or can exhibit some other difference in perspective. The data sets can include data indicative of optical images, sound, and/or any other type of sensory data. In a particular method, the data sets include data indicative of at least three different types of sense perceptions including, but not limited to, acoustical, optical, and pressure.

In an example method, the step of comparing said the sets to one another to identify the invariants includes determining the difference in perspective of said data sets, comparing the data sets using the difference in perspective to determine differences and/or similarities, grouping particular data satisfying one or more predetermined measurement ranges, and generating sensation data indicative of said grouped data to represent the invariants. In the disclosed example method, the invariants include color patches in an optical image represented by the data sets. The step of identifying objects including the invariants includes determining the difference in perspective of said data sets, comparing the invariants to determine relative position, grouping the invariants based on relative position, generating object data indicative of the grouped invariants to represent perceived objects, and integrating all object data and any ungrouped sensation data into a single data structure representative of the observation.

The example method further includes comparing the identified invariants and objects to other invariants and objects identified in another plurality of data sets to identify additional objects including invariants not yet included in previously identified objects. This comparison includes determining the difference in perspective between the two pluralities of data sets, comparing ungrouped invariants between the pluralities of data sets to determine relative movement of the ungrouped invariants, grouping any of the ungrouped invariants that exhibit group movement, and generating object data indicative of the grouped invariants that exhibit group movement to represent perceived moving objects. The example method then continues by integrating all object data and any ungrouped invariants into a single data structure representative of the observation.

Optionally, the invention can be embodied in a computer-readable storage medium having code embodied therein for causing a computer to perform any of the inventive methods disclosed herein.

A system with simulated sense perception is also disclosed. The system includes a sensor set, a sensor interface operative to communicate with the sensor set to capture a plurality of data sets, each data set representing an observation from a different perspective, and a processing unit for processing data and code, the code including a sense perception routine operative to compare the data sets to one another to identify invariants in the data sets, to compare the invariants of the data sets to identify objects including the invariants, and to provide data indicative of the identified objects and invariants. The different observational perspectives can be temporal and/or positional. The sensor set can include optical sensors, acoustical sensors, and/or sensors of other types. In the disclosed example system, the invariants include color patches in an optical image represented by the data sets.

In a particular embodiment, the sense perception routine is operative to determine the difference in perspective of said data sets, compare the data sets using the difference in perspective to determine differences and/or similarities in the data sets, group particular data satisfying one or more predetermined measurement ranges; and generate sensation data indicative of the grouped data to represent the invariants. The sense perception routine is further operative to determine the difference in perspective of the data sets, compare the invariants to determine relative position, group the invariants based on relative position, and generate object data based on said grouped invariants to represent perceived objects. Then, the sense perception routine integrates all object data and any ungrouped sensation data into a single data structure representative of the observation.

The sense perception routine is also operative to compare the identified invariants and objects to other invariants and objects identified in another plurality of data sets to identify additional objects including invariants not yet included in previously identified objects. The sense perception routine determines the difference in perspective between the plurality of data sets and the other plurality of data sets, compares ungrouped invariants of the plurality of data sets with the ungrouped invariants of the other plurality of data sets to determine relative movement of the ungrouped invariants, groups any of the ungrouped invariants that exhibit group movement, and generates object data indicative of the grouped invariants that exhibit group movement to represent perceived moving objects. Then, the sense perception routine integrates all object data and any ungrouped invariants into a single data structure representative of the observation.

As disclosed, the system may be embodied in a robot. The robot includes an electro-mechanical control system, a plurality of sensors, a simulated consciousness system, and means for processing data from said sensors to discern objects in the environment of said robot.

BRIEF DESCRIPTION OF THE DRAWINGS

The present invention is described with reference to the following drawings, wherein like reference numbers denote substantially similar elements:

FIG. 6 is a flowchart summarizing a method of providing sense perception in an electronic system;

FIG. 7 is a flowchart summarizing a method for performing the second step (identify invariants) of the method of FIG. 6;

FIG. 8 is a flowchart summarizing a method for performing the third step (differentiate objects) of the method of FIG. 6;

FIG. 9 is a flowchart summarizing a method for performing the fourth step (compare identified objects and invariants) of the method of FIG. 6; and FIG. 10 is a table summarizing the input and output of various levels of the sense perception module of the system of FIG. 1.

DETAILED DESCRIPTION

Figure 1:
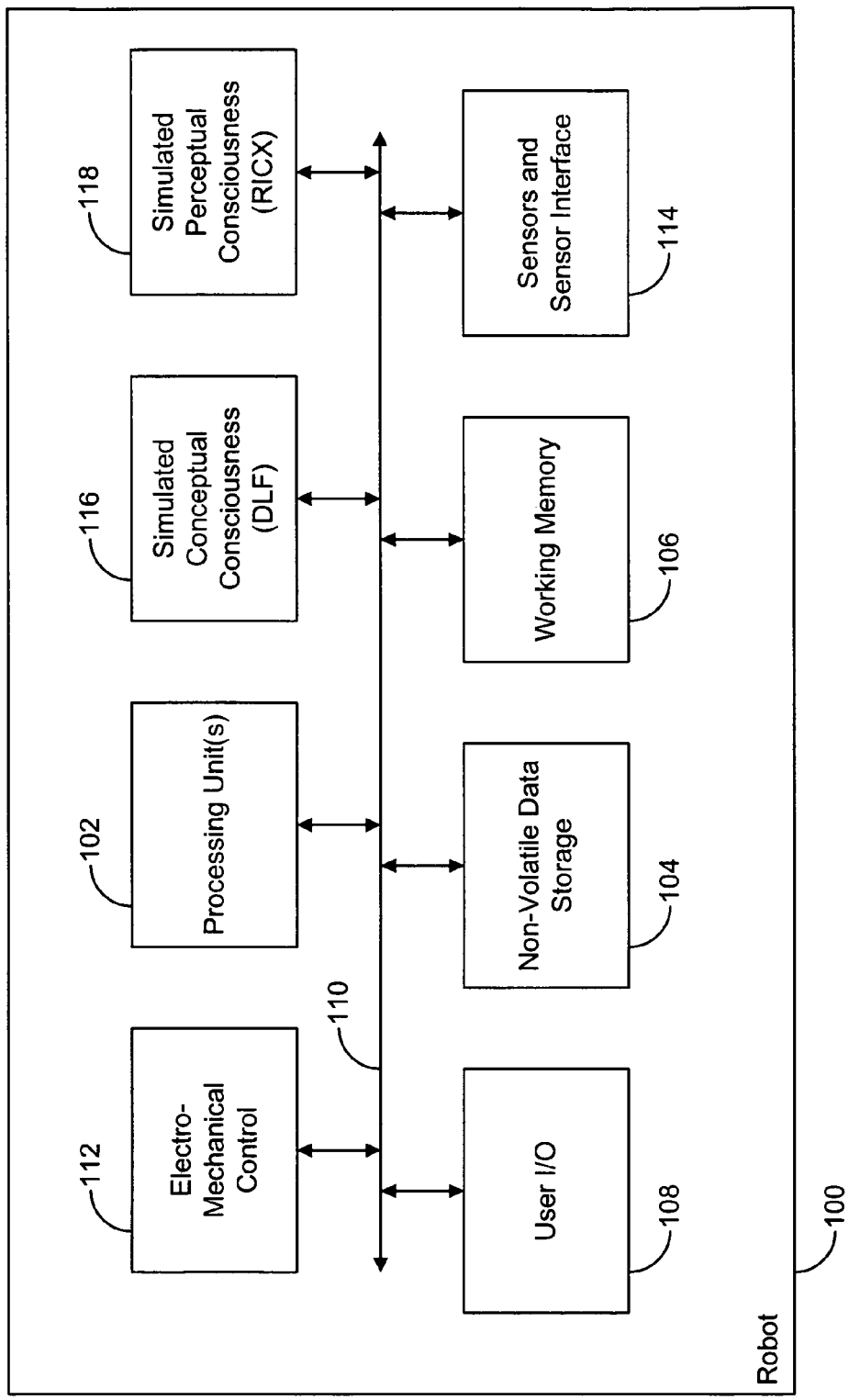
FIG. 1 is a block diagram of a system including simulated sense perception capabilities.

The present invention overcomes the problems associated with the prior art, by providing a system and method of sense perception for an electronic system. In the following description, numerous specific details are set forth (e.g., example sensor types, example data structures, etc.) in order to provide a thorough understanding of the invention. Those skilled in the art will recognize, however, that the invention may be practiced apart from these specific details. In other instances, details of well known computer programming techniques (e.g., coding of described processes) and electro-mechanical design have been omitted, so as not to unnecessarily obscure the present invention.

A sense perception system for an electronic system and/or robot is described herein. This technology will be referred to generally herein as RICX technology (Reality Identification Cortex). An important use of the RICX technology is to provide sensory input to higher level systems that provide simulated consciousness for electronic systems and/or robots. A system and method for simulating consciousness is described in the inventor's U.S. patent application Ser. No. 11/294,622, now U.S. Pat. No. 7,499,893 B2, entitled "System And Method For Simulating Conciousness," filed Dec. 5, 2005, which is incorporated herein by reference in its entirety. The technology of that application will be generally referred to herein as DLF (Digital Life Form) technology. DLF technology is also described in the book *How to Simulate Consciousness Using A Computer*, by Gregory J. Czora (http://www.blueoakmountaintech.com/DLF Book.html/ Cover.html), which is also incorporated herein by reference in its entirety.

DEVELOPMENT OF THE INVENTION

The development of RICX technology was motivated by DLF technology and the need to automate the latter's sensing and data input process. The DLF technology is a layered model architecture that can use computer systems to simulate life-forms and biological consciousness as processes that are similar to and emulate the processes exhibited by higher animals and people, at least to whatever degree that is possible with current technology. DLF technology substitutes computer technology that is specially programmed for this purpose, technology designed to emulate biology. DLF technology is designed to simulate consciousness to help robots perceive and identify objects in the world around them and to simulate the formation of human-like concepts of these objects and their relationships in the world. By doing so, robots running software based on RICX and DLF technologies will be able to use the human-like concepts in conjunction with a continuous stream of human-like sense perceptions to inductively produce and "understand" simple natural language sentences about objects in the world. In the patent application for DLF technology and the proof of concept DLF Program, most of the input that simulates sense perception was hand coded by a programmer. RICX technology will substantially improve the effectiveness of a DLF technology robot.

A DLF Technology robot will have much better performance with the sense perception process of detecting and identifying objects in the world being automated and working more like it does in real life-forms, which is precisely what RICX technology is designed to do. Therefore, the inventor has developed RICX technology in order to make an improved simulation package that combines both DLF and RICX technologies.

Both RICX and DLF technologies are adaptations of processes based on the concepts and principles of the nature of biological consciousness and how it works, as discovered and developed by Ayn Rand. Based on Rand's clear explanation of the nature of consciousness ("Existence IS Identity. Consciousness Is Identification."), aspects of this invention apply that explanation to the design of an entirely new technology for simulating consciousness using computer hardware and software that is specially programmed to simulate key biological functions. The development of this invention takes the clear understanding of what consciousness is and how it works in people, and then uses this understanding to simulate the processes of consciousness using computer systems. It should be noted that Ayn Rand's ideas take sense perception as a given, a starting point for her work in philosophy and writing fiction. As far as is known, she never investigated how sense perception works in detail, other than to say that "a percept is a group of sensations automatically retained and integrated by the brain of a living organism." (*Introduction to Objectivist Epistemology*—Ayn Rand, Meridian, Expanded Second Edition, 1990, ISBN#0-453-00724-4) Rand used sense perception defined in this way to develop her theory of concept formation (see reference 3), which is the theoretical foundation for the operating theory on which DLF technology is based. While DLF technology can operate in a limited way with pre-programmed sense perception software to enable it to identify objects in the world, to reach its full potential, DLF technology requires a means of doing so that more accurately simulates the automatic nature of biological sense perception. This disclosure is the result of the inventor's work to observe the operation of sense perception and generate logical inductions regarding its operation using Rand's clear explanation as a guide. RICX technology is the result of that work and is intended to provide the sense perception "service" for DLF technology robots.

As noted earlier, commonly used pattern recognition technology and the HTM technology produced by the work of Jeff Hawkins is the closest the state of the art comes to providing tools that could be used for simulating sense perception. Hawkins' book (*On Intelligence*—Jeff Hawkins, Owl Books, 2004, ISBN#0-8050-7853-3) and white paper (*Hierarchical Temporal Memory. Concepts, Theory, and Terminology* by Jeff Hawkins and Dileep George, 2006, Numenta Inc., can be downloaded in PDF format from http://www.numenta.com/) provide an excellent summary of what is known about the neurology of how the human brain operates and performs sense perception, such as how the eyes make saccades approximately three times per second and the layered processing of the human neo-cortex. Other researchers have identified that even adult brains rewire themselves by growing new neurons, and that individual neurons are wired to detect specific objects (see *Invariant visual representation by single neurons in the human brain*, Quiroga, Reddy, Kreiman, Koch, and Fried, Nature:Vol 435|23 June 2005|doi:10.1038/nature03687). All references cited in this application are incorporated hereinby reference in their respective entireties.

After having worked out the basics of RICX technology, the inventor considered the work of James J. Gibson's "ecological approach to visual perception" (*The Ecological Approach to Visual Perception* by James J. Gibson, Lawrence Erlbaum Associates, Copyright 1986, ISBN#0-89859-959-8). Gibson provides a basis for understanding the overall context of how sense perception processes data, the complete view as it were, as well as the integration of the various facets of sense perception, which not only cannot be disassociated from each other, but cannot be disassociated from the actions of the sensing life-form as many researchers routinely do. Moreover, Gibson makes a powerful case that the human concepts of art, photography, and communication are not appropriate for formulating the premises in a theory about sense perception. Vision, touch, and hearing for example are not separate sensory "channels" like TV channels, and visual perceptions are not processed like an artist does to make a painting or a digital camera to make a picture. Naïve realism is a false theory, and there is no "little man" to receive the communications over the "channels" or view the "pictures" when they arrive in the human brain.

All of the descriptions of the direct observations of the function of neurons, their explanations, and the summaries of other experimental results in cognitive psychology have been extremely helpful to the inventor in the creating the design of RICX technology.

EXAMPLE EMBODIMENT

FIG. 1 is a block diagram of a DLF robot 100 including one or more processing units 102, non-volatile data storage 104, working memory 106 and user input/output ("I/O") 108, all intercommunicating via a system bus 110. These components are similar to those found in general purpose computers. Processing unit(s) 102 process data and code to impart functionality to the robot 100. Non-volatile data storage 104 stores the data and code and retains the data and code even when robot 100 is turned off. Examples of non-volatile data storage include, but are not limited to, conventional fixed hard drives and removable media drives. Working memory 106 (e.g., random access memory) provides memory to directly support the processing of data and code by processing unit(s) 102. For example, blocks of data and code can be transferred from non-volatile data storage 104 into working memory 106 where it can be accessed more quickly by processing unit(s) 102 via internal bus 110. User I/O 108 provides a direct means of communication between a user and robot 100. Typical user I/O devices include, but are not limited to, a keyboard, a monitor, a pointing device, speakers, and so on.

Robot 100 further includes an electromechanical control component 112, a sensors and sensor interface component 114, a simulated conceptual consciousness component (DLF) 116, and a simulated perceptual consciousness component (RICX) 118. These components are shown separately to facilitate a clear explanation of the invention. However, it should be understood that the functionality of these components can be realized by processing unit(s) 102 executing code in non-volatile data storage 104 and/or working memory 106. Alternatively, the functionality of these components can be implemented with dedicated hardware, software, and/or firmware. Electro-mechanical control component 112 controls the mechanical systems (not shown) that provide for any movement of robot 100 necessary or desirable for robot 100 to carry out its intended utilitarian function. Sensors and sensor interface 114 provide a means for capturing data indicative of physical phenomena in the environment of robot 100 and communicating that data to other components of robot 100. Examples of sensors that can be used with the present invention include, but are not limited to, optical sensors, acoustical sensors, pressure sensors, temperature sensors, chemical sensors, and so on. Simulated Conceptual Consciousness (DLF) 116 handles high level processing including, but not limited to, behavior control, reasoning, and natural language capabilities. Simulated perceptual consciousness (RICX) 118 processes sensor data from sensors and sensor interface 114 and provides data indicative of the physical make up of the robot's environment to DLF 116.

Virtually any type of sensor could potentially be used with the invention. However, because an important purpose of RICX technology is to mimic human sense perception, sensors should approximately match the detection specifications for the human senses. Many good sensors already exist and are available for state of the art robots. It is important to keep in mind that the role of sensors used for the purpose of simulating consciousness is simply to transduce the energies that impinge on them and convert these energies to another form of energy, or digits in the case of computer systems, all the while conserving whatever patterns each energy may carry. This conversion in kind of energy is not a disintegration of the information in the patterns of the energy from the plenum of reality, but rather it is a facet of the plenum. Each sensor is like the facet of a diamond in that it provides a perspective on the plenum that is the stone itself. The information in these facets is the content of consciousness that needs to be conserved as it is transferred into the RICX system, just as it is conserved by the sensors in animal perceptual systems.

Once transduced into the system, the various patterns in the energies must be identified by properties and measurements from the raw digital data. Identification requires the comparison of sensor data from various times as will be explained in greater detail below. Simulating the low level processing such as occurs in the retina of the eyes, the pressure sensors of the fingers, and the cochlea of the ears, and so on, may be accomplished with off-the-shelf products. Many good sensors are already sold, as well as the drivers that aim and focus them. In the case of vision and hearing, it is necessary to saccade these simulated "eyes" or turn the head to enhance hearing or odor detection by providing more comparison data. Drivers to do this may or may not also be commercially available, but can at least be adapted from existing state of the art simulation software already designed for robots. For example, commonly used bitmaps (as currently designed) may or may not work for simulating vision and other senses, because they are not designed to saccade and to maintain the relationships of various areas of the visual field like the human visual system does. Bitmaps were design as mechanistic human tools for various computer oriented purposes such as communication and picture processing, not as means to measure and identify information to be transferred to the visual cortex in a brain for survival purposes. However, it should be possible to use some of them anyway, or at least modify them so they can be used for this new purpose.

The operation of RICX 118 is based on a simulation of the neo-cortex. The main thing that should be kept in mind during the design process of any specific implementation is that the design should support the operational efficiency of the perceptual process as described below, while being as true as possible to the way similar processes occur in biology in living animals.

Reality is a plenum, and life-forms perceive it as such. There is evidence that the seat of this processing is the brain stem in higher life-forms. Without implying naïve realism, the brainstem may be the plenum of reality so to speak, the place in the human brain where the control processing for action decisions interfaces with the faceted perceptions from the senses.

In order for action decision processing to happen using percepts (identified and measured invariant patterns and objects), the perceptual facets must be converted and integrated into the appropriate input by the lower processing layers that process the raw digital data from the sensors. The result will be a system that "sees" roughly what you and I see when we look at the plenum of reality, though in a somewhat different form because humans are not digital.

Having made the point about reality being a plenum that is preserved (not disintegrated and then reintegrated), it is necessary to explain that that fact does not totally eliminate the need for integration to be performed at some points in the processing of sensory data. The transfer of data from receptors in biological eyes, for example, is a largely parallel process. The optic nerve is known to have millions of neural pathways. The computer technology that the RICX system uses, however, is much more a serial process. In addition, computers process differently than neurons do, so the identification of say a patch of "blue" by a DLF robot using computer technology will require some calculations to integrate the sensor data, whereas a biological neural network may not need to do so.

In terms of lower level processing layers, it is clear that probably at least 4 layers will be desirable, and possibly more. As explained hereinafter, percepts are not a simple data type, but are integrations of pixels into sensations and sensations into objects. How many levels of processing that will be needed to make a system operate in a practical way depends on the specific details of the particular system.

As indicated above, RICX 118 provides "sensory" data to DLF 116. Because one of the key reasons for developing RICX technology in the first place is to automatically generate percepts as data for the higher level processing of DLF technology that simulates human reason and simple natural language capabilities, the data requirements and control requirements for sensor direction and focus on the various facets of the plenum of reality must be taken into account from the outset. Therefore, for a particular system, the interfacing designs and relationships between these two technologies (RICX and DLF) must be planned and worked out carefully. Important aspects of these relationships are that the RICX design should accommodate the identification of reality as a plenum by having as inputs information about its various facets, and output data in a predetermined, format (e.g., identity lists), because the DLF processing layer design requires data in a predetermined format (e.g., identity lists of property/value pairs) as its inputs. So to begin with, the entire plenum must be sensed as a piece, including its dynamic aspects as the sensing system moves through the plenum and the dynamics that result from other actions of the sensing system, such as saccades, selective focus, head turning, locomotion, and so on. Motion causes both global and local changes in what information arrives at sensors. What Gibson calls the "optic array" flows around and past the sensing system. When observing specific objects in a scene, the various points of observation determine the information each eye senses (light travels in straight lines), as well as what parts of objects may be occluded from view by various edges of other objects. Human observers learn what such changes imply about objects as observers move and change their viewpoints.

Once sensed by two or more sensors that transduce energies from two or more facets of the plenum of reality (e.g. vision, sound, touch), the information thus gleaned must be processed so it can be identified. That is, so the invariant patches of color, sequences of sounds, areas of pressure, kinesthetic forces, odors, tastes, and so on can be differentiated from those that vary constantly, and from each other. Note that these various facets of the plenum do not have to be integrated because they are all integral parts of the plenum of reality already. They, in fact, need to be disintegrated. The invariants must be differentiated from the plenum (chunked into process-able pieces so to speak by the selective focus of consciousness) in order to be identified. Differentiation is one of the two key processes of consciousness, but it does not mean that the differentiated data is somehow isolated from its context, the plenum of reality from which it is derived. Differentiation simply means that some parts of reality have different measurements than other parts, and one of the capabilities of consciousness is to focus on this versus that. To differentiate is simply to make a metadata note that one part of a scene is more like its immediate surroundings than another part of the scene, or that one object in a scene is bigger or smaller than another as part of the processing. Differentiation is part of the process of identification by comparative measurement. It is not a process of total disassociation or disconnection. To do that is to drop context and render the information just gleaned from reality useless.

Once the differentiation of invariants is done, objects can then be differentiated to produce a collection of identity lists of property and value pairs (or other suitable data structure) for each object at least partially visible. The identity lists are the output for higher level processes including, but not limited to, action control, concept formation, logical induction, logical deduction, reduction, integration, and natural language processing.

The question that may arise at this point is: Where is the representation of reality for the DLF robot to perceive?" The answer is that there is none. Reality is outside the RICX system (where it belongs), and it stays there, integrated and as a constant reference whenever needed. If the DLF robot needs to, it can always look at the plenum of reality again, and yet again, as animals and humans do constantly. The output of RICX 118 is the invariants and the identity information of objects, not a photographic or artistic representation that has been integrated from several "sensory channels."

Figure 2:
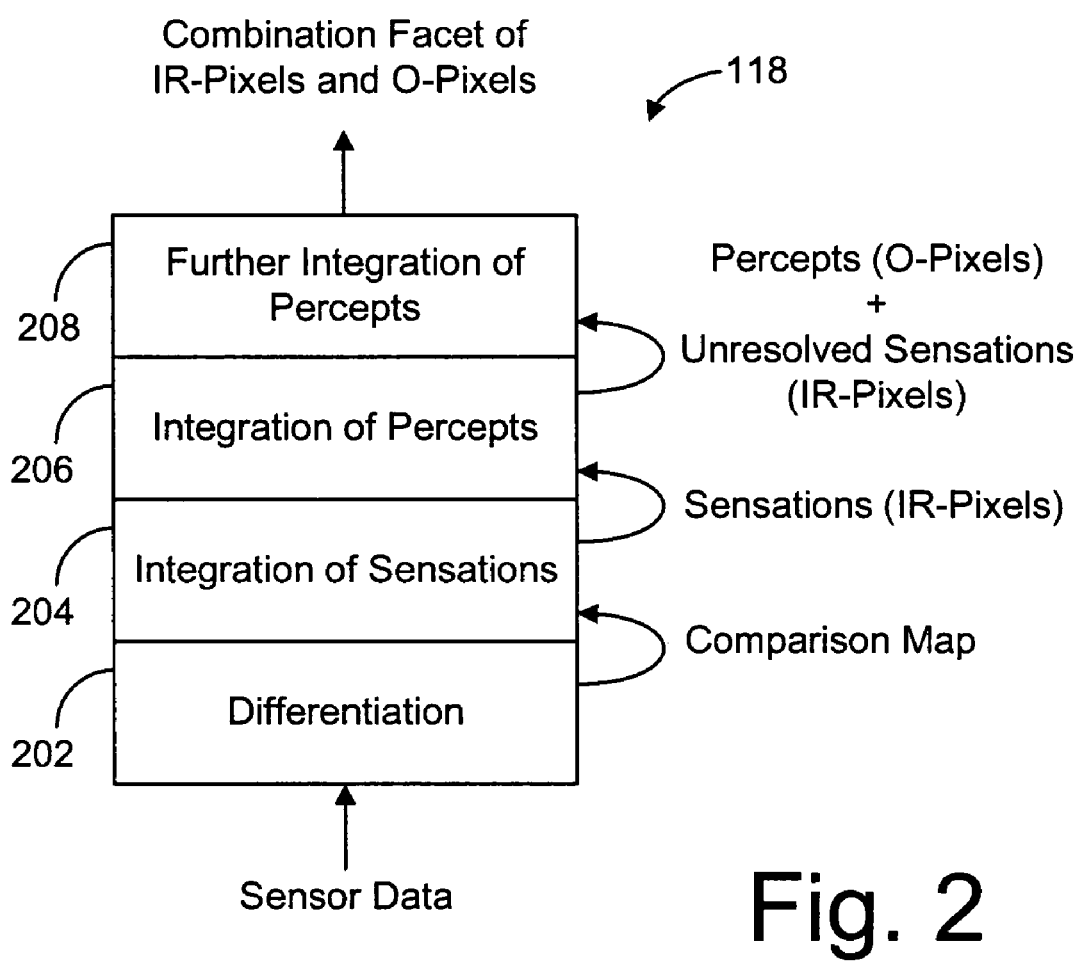
FIG. 2 is a block diagram of the sense perception module of the system of FIG. 1.

FIG. 2 is a block diagram that illustrates the layered structure of RICX 118. As shown, RICX 118 includes a differentiation layer 202, a refined differentiation layer 204, and integration of percepts layer 206 and a further integration of percepts layer 208. FIG. 2 also shows the output of each layer of RICX 118 that is passed up to the next layer.

The following process describes the overall action of simulated sense perception by RICX 118. The focus of this explanation is on vision, because vision is one of the most complex senses, yet provides a clear example of the operation of RICX 118. However, it should be understood that vision is only one facet of the plenum of reality, and that simultaneous and parallel process running in a DLF robot (also in RICX 118) sense and process the other facets of hearing, touch, and so on. Nevertheless, it is the same processing system (simulated perceptual consciousness RICX 118) that will eventually identify and output the additional property and value pairs that are available from the sensor output from other facets. This will occur as a part of an expansion of the same processing stream and internal data structures used to identify the properties for vision input. The other facets are not processed in separate pathways or "channels" as occurs in state of the art systems.

This identification process of what is in the sensory data used by RICX 118 is based on the "some but any" principle that Ayn Rand identified as part of the concept formation process, and Drs. Leonard Peikoff and David Harriman later extended to the process of logical induction or premise formation. The author has now identified how this principle also operates to integrate sensor outputs into sensations (IR-Pixels when simulated) and sensations into percepts of objects (O-Pixels when simulated). IR-Pixels and O-Pixels are terms coined by the inventor, and will be described in greater detail hereinafter. The "some but any" principle is the very basis for extracting invariants from constantly changing data. The invariants are the measurement ranges that various property and value pairs typically fall into as a result if the natural identities found in reality.

The basic idea of the "some but any" principle has two main components. First, the identities of objects in the world consist of one or more characteristics, attributes, or properties (the inventor prefers the word "property"). Every property is quantify-able and must have a unique measurement value (number) associated with it. This is the case because to exist at all every "thing" must be a "something." In other words, to exist at all an object must have at least one property, and a property must exist in "some" specific amount, but it may exist in "any" amount that is the typical measurement range for that property. The physical properties that exist independently in various arrangements in reality are the source of the information that becomes the content of consciousness when sensed and processed in a specific manner.

This fact is supported by the laws of science, such as physics or chemistry. For example, an earth bound land animal can be no smaller than chemical processes allow and probably not much bigger than the biggest dinosaur was. As another example, it is known that the size of insects, which do not have lungs, is limited by the percent of oxygen in the air and its ability to defuse to internal cells in their bodies. As yet another example, a stone that had no property of "size" would not be a stone; it simply would not exist. An endless number of similar examples are easy to think of.

The second main component of the "some but any" principle is that while the identity of every object is unique, due to its specific list of properties and their measurement values, in any group of similar objects, the measurements of all of their commensurable properties will necessarily fall into a range of values. This is a natural consequence of the first component of the "some but any" principle. Some things will be bigger or smaller than others due to natural variations of the materials of which they are made or the requirements of the various environments in which they exist, and these differences will fall within the ranges that the underlying physical laws cause. Moreover, throughout biological evolution, it should be no surprise that life-forms have taken advantage of and naturally selected for these facts in the way they use their consciousness to identify objects in the world in order to improve their chances of survival.

The "some but any" idea is the underlying principle that enables the methodical concept formation process in human consciousness to establish a "one to many" relationship (between a concept and its many instances or "units") based on the observation of two or more specific objects. The "some but any" principle is the basis for including and integrating an unlimited number of specific objects or "units" into a group of two or more similar members based on the observed measurement ranges of their properties. This principle also enables the formation of one or more valid inductive generalizations based on the observation of just one instance of causal action, provided the acting objects were already instances of valid concepts. The conscious process of logical induction effectively leverages the "some but any" relationship that already exists in previously formed and validated concepts (such as "push," "cause," "ball," and "roll"). So, for example, if one had these previously validated concepts and observed the experience of pushing a ball only one time, one could then induce the fact that: "Pushing causes balls to roll." Why? Because the "some but any" principle was used to form all the individual concepts in that premise in the first place, and so the induction is valid because the concepts are valid (concepts connected to observations directly or through chains of other valid concepts, and not because of probabilities). The premise is valid because the premise's meaning is the union of those concepts. It is not only observation that validates the process of logical induction, though that is part of it, but every valid induction is supported by the validity of the entire human conceptual system and by all of the observations of reality and thinking that were necessary to build that system in the first place. This is the power of the "some but any" principle. It also points to the need for precision of thought.

DLF technology in general, and DLF 116 (FIG. 1) in particular, uses an adapted version of the "some but any" principle to enable computers especially programmed for this purpose to simulate the goal-directed action and the conscious processes of a life-form to calculate a special data-type that simulates human concepts. Simulated concept formation is a level of simulated consciousness that forms and processes abstractions, abstractions that are formed methodically on the basis of the simulated conscious identification of one to many relationships, relationships which are in turn based on the observation of simulated sense perceptions of real objects in the real world. In the DLF technology system, ontologies are not arbitrary, but methodically calculated based on observation, measurement; and cognitive needs.

The inventor has recognized that a percept of an object or scene is also an example of a "one to many" relationship: One percept relates some number of sensations (the integrated output from individual sensors), except that sensations and percepts are formed by automatic biological functions, as oppose to concepts and inductions, which are formed by conscious choice. In other words, a percept is a group of sensations automatically retained and integrated by the brain of a living organism. Sense perception, like concept formation, is about the reduction of processing units through the use of one to many relationships.

As indicated above, vision is used as the primary example for the explanation of the present invention, but it should be understood that all the other senses, including non-human senses, work in a similar way as expansions of this basic neo-cortex simulation process.

Referring again to FIG. 1, data enters RICX 118 when it is transduced by sensors 114, which include a sensor array of various types of sensors that gather data from several facets of reality. Sensors in particularly simple designs may be limited to vision, sound, touch, and kinesthetics. However, other types of sensors may be added such as taste or smell or infra red, because, theoretically, any type sensor could be used. Sensors and sensor interface 114 includes driver software that identify the data from each sensor by intensity, measurement range, and temporal frequency (possibly other property types), and then outputs this information as part of a vector that also contains the data of each sensor's pixels for a given instant (and the analogs to pixels for other facets, such as "sixels for sound and "tixels" for touch, "kixels" for kinesthetics, etc.).

Sensors will sense (capture data) multiple times per second (probably 3 or more to approximate human sensing), and they must be in constant motion as they sense to simulate the saccades of the human visual system. As a result, they can observe a scene from different perspectives. Saccades are not a side effect of human vision, saccades cause color pattern detection, the further processing of which causes sensations and percepts of objects. Sensors measure the instantaneous state of the visual field at each saccade. Sensing 3 times per second will provide multiple data points (pixels) from nearby regions that make it easier to extract the implicit identity information and context in the sensor output, information that is the relationships within the visual field (and the world) that persist over time. For example, vision sensors saccade or move to a new fixation point to provide multiple data points in position and time for every property in every scene. In other words, saccades cause color patterns based on the comparison of 3 or more individual sensor samples over the entire visual field. The facet field boundary serves as a context boundary for calculations. Something analogous to saccades occurs for other types of sensors, such as for sound and tactile pressure. For sound, this may require head turning to get the same saccade effect. The effect of having a continuous flow of data from slightly different perspectives provides the basis for three important sub processes: differentiation, integration, and error checking, which occur in the various layers of RICX 118. The data from each sample sensed is stored in an active memory that conserves relative location of all the sensor outputs (pixels) of the visual field, so that implicit information can later be extracted by further processing.

Differentiation is the sub process of consciousness that finds the center of focus for each facet for vision and other senses and identifies the measurement ranges of all the sensor outputs in the visual field. Differentiation for pixels (also sixels, tixels, etc.) occurs in the first level 202 of the simulated neo-cortex of RICX 118. Differentiation is done by comparison algorithms that input and compare both all the sensor outputs in the field from each saccade and also between saccades, in order to identify which sensations persist, and if they do, over time a record is made of their typical range of variation and relative location in the visual field as the active memory builds up knowledge of the world (like an infant learning to see, hear, touch for the first time). The output of differentiation is a comparison map produced every second over 3 saccades that detects and shows the differences in sensor data types and measurement values in various-areas of the visual and other senses fields. The map is passed up to the second level 204 of the simulated neo-cortex.

The second level 204 and higher levels of the simulated neo-cortex refine the differentiation map by performing additional comparisons and identify more about the typical measurement ranges of various types of sensor data and their relative locations in the sensory fields, independent of which sensor sensed it. The output of the differentiation process is a series of "Irregular pixels" (IR-Pixels, also sixels, tixels, etc.) that together encompass the entire visual field as a set of color and other patterns. This information is stored in the active memory of the simulated neo-cortex so it can be used for the future analysis and for the integration and error checking processes. Various error correction algorithms also operate continuously in the background during differentiation to check the results of the differentiation process against data past experience stored in memory says is typical for a given context.

Integration of sensations is the sub-process of consciousness that calculates simulated sensations (IR-Pixels) from groups of individual pixels in the visual field, pixel vectors that were derived by the differentiation process from the data of several individual sensors. The formation of simulated sensations occurs when sensory vectors for each pixel (also sixels, tixels, etc.) are integrated in the second level 204 of RICX 118, based on the comparison maps output by the differentiation process of first level 202. The comparison maps contain the data types produced by several nearby sensors for each facet of reality and their measurement ranges, independent of the sensor that sensed them. Areas of the visual field with sensor data that are commensurable (share same data type and/or measurement range such as a color) are then automatically calculated as units, or members of a group of two or more similar members. This is done based on the "some but any" principle that the units must have some measurement value, but may have any value within their typical measurement range (such as for the color "blue"), with the typical measurement range serving as the context boundary for the calculation. The processed sensor data points (pixels) in the group (the units) are thus integrated into a simulated sensation.

The simulated sensation covers some portion of the visual field and is integrated as part of the visual field. The sensation is the data instances (pixels) from that region, integrated and stabilized at a fixed value in the measurement range (perhaps the average). For example, if what is being sensed is a patch of sky through some trees, all the individual processed visual field pixels (units) are integrated into that patch, which is perceived as a sensation of "blue," as opposed to the green of the surrounding leaves. From that point forward and so long as the sensor input remains in its range of values, the entire region of the visual field that the sensation covers is utilized as a single processing unit by the levels above it in the simulated neo-cortex. Returning to the example, the blue color is sensed and processed in the visual field as one discrete thing (the IR-Pixel) relative to the visual field as a whole, not as many, tiny separate things. While it is true that the sensors that happen to detect the blue color have sensed some light that covers a certain small region of the visual field (be that at a certain relative location in the visual field as it moves with saccades), but those sensor outputs must have some intensity, some frequency, and some location. (Note that the detecting sensors could be anywhere, but the visual field boundary also provides a context boundary that limits the data set. Calculated sensations are contextual in this sense.) In each saccade, each sensor outputs these data types for properties and the values that are the measurements of the instantaneous data for each as a vector. On the next two saccades, different sensors in a slightly different region of the visual field will sense these same data (perhaps with slightly different measurement values), but they will exist somewhere in the visual field, if the object and the light that illuminates it persists. It is in this way that the data and its context boundaries are detected and prepared, so the integration process can use these data to calculate it into sensations (IR-Pixels), thereby reducing the number of processing units for the next level of the simulated neo-cortex. In other words, saccades and their integration cause sensations of color patterns.

Once the sensations have been calculated and integrated for each 3 saccade set, a comparison map of sensations (IR-Pixels) is produced, and error checking is completed, then the results are stored in local memory. Simultaneously, the results are passed up to the third level 206 of the simulated neo-cortex where percepts of objects are integrated from sensations for the visual field. The simulated sensations are patterns of color and for simulation purposes there are 10 basic colors: Red, Orange, Yellow, Green, Blue, Indigo, Violet, Black, White, and Transparent, with grey being combinations of black and white. These color patches are the first level of invariants RICX 118 extracts from the visual facet of reality. Similar processing occurs for sixels and texels, and the output of this processing is additional property value pairs. For example, the sound of rustling leaves would be sensed simultaneously with the sight of a patch of oscillating green, so the invariant property value pairs from the sound are added to those that result from the visual processing to produce a combined sensation of color and sound together.

Integration of percepts of objects is the sub process that forms simulated percepts of objects in scenes from individual simulated sensations and is another reduction in the number of processing units for higher levels in the simulated neo-cortex. In other words, color patterns in the form of IR-Pixels (simulated sensations) are grouped to cause the formation of simulated percepts of objects. The formation of simulated percepts of objects occurs in the third level 206 of the simulated neo-cortex based on the comparison maps output by the differentiation process of level 202 and the sensations produced by the second level 204 of RICX 118.

Starting with the comparison map of sensations, also calculated by the previous level 204 of RICX 118, certain areas of the visual field with sensations that share certain foreground properties and a horizon are then regarded as units (as opposed to the background as the rest of the visual field serving as a context boundary). The foreground and background are differentiated by comparing simulated sensations of color patterns, distance perspective, relative motion over time, and so on. That is, certain groups of sensations are regarded as members of a group of two or more similar members, as long as they are in the same measurement range or share some other relationship such as relative motion or part to whole, such as those of a tree branch swaying in the wind as its leaves make a rustling sound. This grouping is done based on the "some but any" principle that the individual sensations must have some measurement value, but may have any value within their typical measurement range for these sensations of visual and sound properties.

The sensations in the group (the units) are then integrated into a simulated percept of an object. The simulated percept is a distinct data type called an "O-Pixel" that covers some portion of the visual field, contains the simulated sensations from that region, is stabilized at a fixed value in the measurement range for each of its unit sensations, and is a single processing unit used by higher levels in the simulated neo-cortex (RICX 118). For example, if we widen the portion of the visual field considered in the example for simulated sensations above, to include the sensations of the green leaves and the grey and brown areas of the trunk and branches, the "objects" integrated from those sensations would be one or more trees, with one of the branches framing a patch of blue sky between its leaves, each of which would be an O-Pixel. (Note that like simulated sensations, simulated percept definitions are contextual with the visual field boundary being their context boundary, so percept definitions can change with visual context and have a unique location in the visual field from the perspective of the conscious perceiver.) These simulated objects are the second level of invariants the RICX system 118 extracts from the visual and other facets of reality. The sound, touch, and other sensations that were processed in the previous level and added as additional properties to the sensations this level has integrated into a percept of an object are also included as part of the identity of that percept. So the simulated percept contains all the property value pairs that make-up its identity, no matter from which facet of reality they happen to come.

As with simulated sensations, error checking occurs before percepts are passed up to the next level 208 of the RICX 118. From that point forward, the entire region of the visual field that the simulated percept of this object or scene covers is utilized as a single, invariant processing unit by the levels above it in RICX 118 or working in conjunction with it, such as those in the DLF program that process simulated percepts as data to form simulated concepts. For instance, the formation of the concept "tree branch" using the some but any principle to integrate two or more percepts of other tree branches (with those words acquired from a human trainer). Note that the calculated integration of invariants from sensor data in these examples is not a probability nor is it arbitrary. It is real, certain knowledge about a facet of the plenum of reality that is derived from direct measurements and simple algebraic calculations based on direct measurements. This is an important aspect of the invention that distinguishes the invention from probability based pattern recognition systems.

Finally, in a fourth level 208 of RICX 118, further integration of percepts occurs. In particular, sensations (IR-Pixles) that have not yet been integrated into percepts of objects are analyzed to determine if such integration is proper. One example of such further analysis is the comparison of the current three saccade data set to previously processed three saccade data sets. Comparison with previous data sets facilitates, for example, the identification of moving objects.

Figure 3:
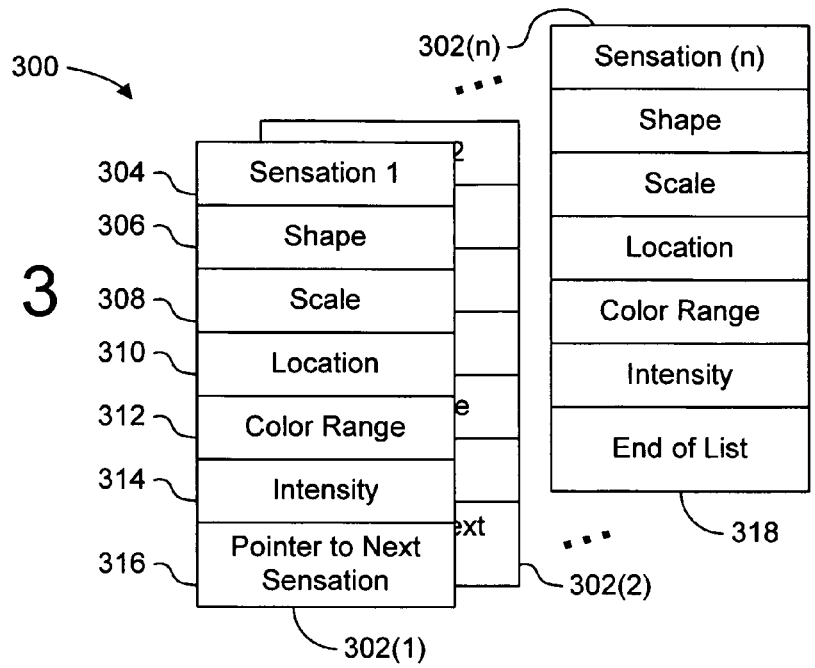
FIG. 3 shows an example data structure for representing sensations.

FIG. 3 shows an example data structure 300 for storing data corresponding to the above described sensations. Data structure 300 is a linked list of records 302(1-n). Each record 302 is associated with a perception sensed by RICX 118 (FIG. 1) and includes a sensation field 304, a shape field 306, a scale filed 308, a location field 310, a color range field 312, an intensity field 314, and pointer 316 to the next sensation record 302. Sensation field 304 holds data that uniquely identifies the associated record 302. Shape field 306 holds data indicative of the shape of the sensation associated with the record 302. Scale field 308 holds data indicative of the size of the sensation associated with the record 302. Location field 310 holds data indicative of the location in the visual field of the sensation associated with the record 302. Color range field 312 holds data indicative of the color of the sensation associated with the record 302. Intensity field 314 holds data indicative of the light intensity of the sensation associated with the record 302. Finally, pointer 316 holds data indicative of the memory location of the next record 302 in the list 300. All of the records of list 300 include similar fields, except that the last record 302(n) includes an end of list identifier 318 instead of a pointer 316. Together, the fields and the data contained therein form one example of the above-described property/value pairs.

Figure 4:
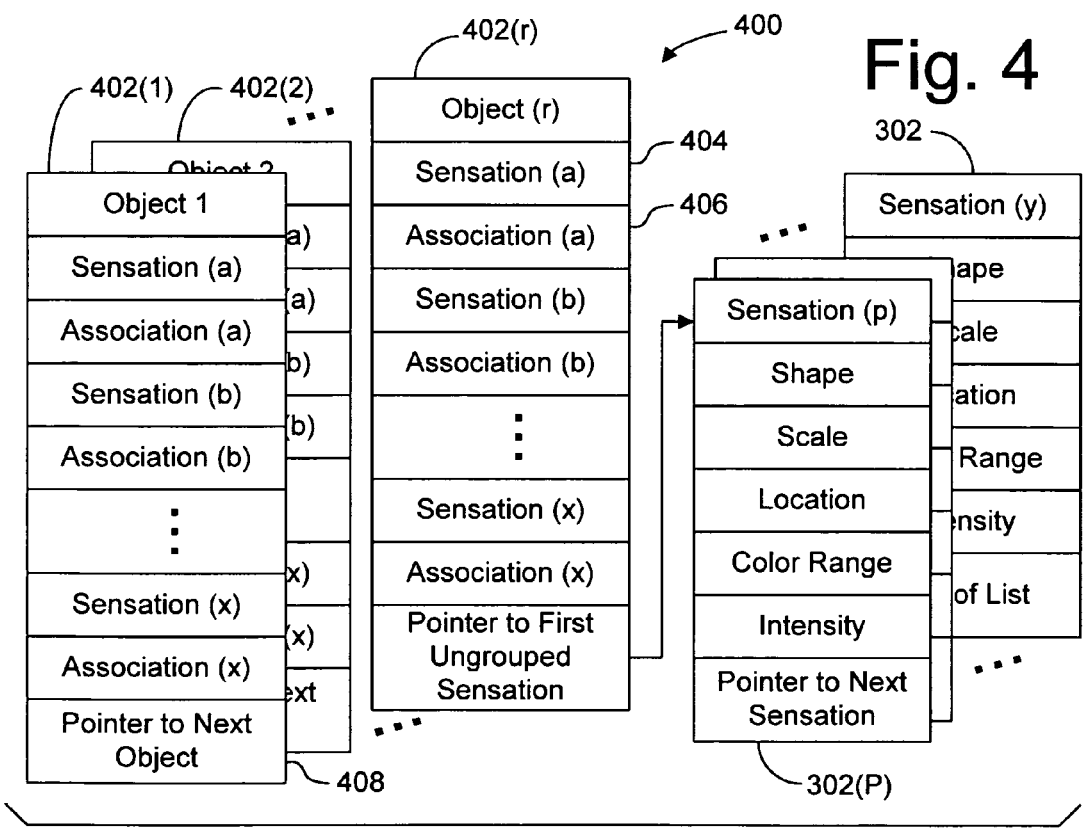
FIG. 4 shows an example data structure for representing objects and sensations.

FIG. 4 shows an example data structure 400 for storing data corresponding to perceived objects. Data structure 400 is a linked list of object records 402(1-r) and sensation records 302 (p-y). Each object record 402 is associated with an object perceived by RICX 118 (FIG. 1), and includes a perception field 404 and an association field 406 for each perception integrated into the perceived object and a pointer 408 to the next record 402 or 302 in the list 400. Perception field 404 includes data identifying an associated perception. For example, such data can include an address pointer to the associated sensation record 302. Association field 406 includes data indicative of the association (e.g., relative position) of the corresponding perception with the other perceptions in the object record 402.

Pointer 408(r) points to a record 302(p) corresponding to the first ungrouped sensation in the data set. Records 302(p-y) correspond to records that have not been integrated into a perceived object record. Otherwise, they are identical to the sensation records described above with reference to FIG. 3.

It should be understood that other types of data structures can be used with the present invention. For example, sensation records 302 and object records 402 can be stored in a relational database. As another example, data can be represented by processes, which recognize values satisfying a measured range of values (e.g., a range of wavelengths of light).

Figure 5:
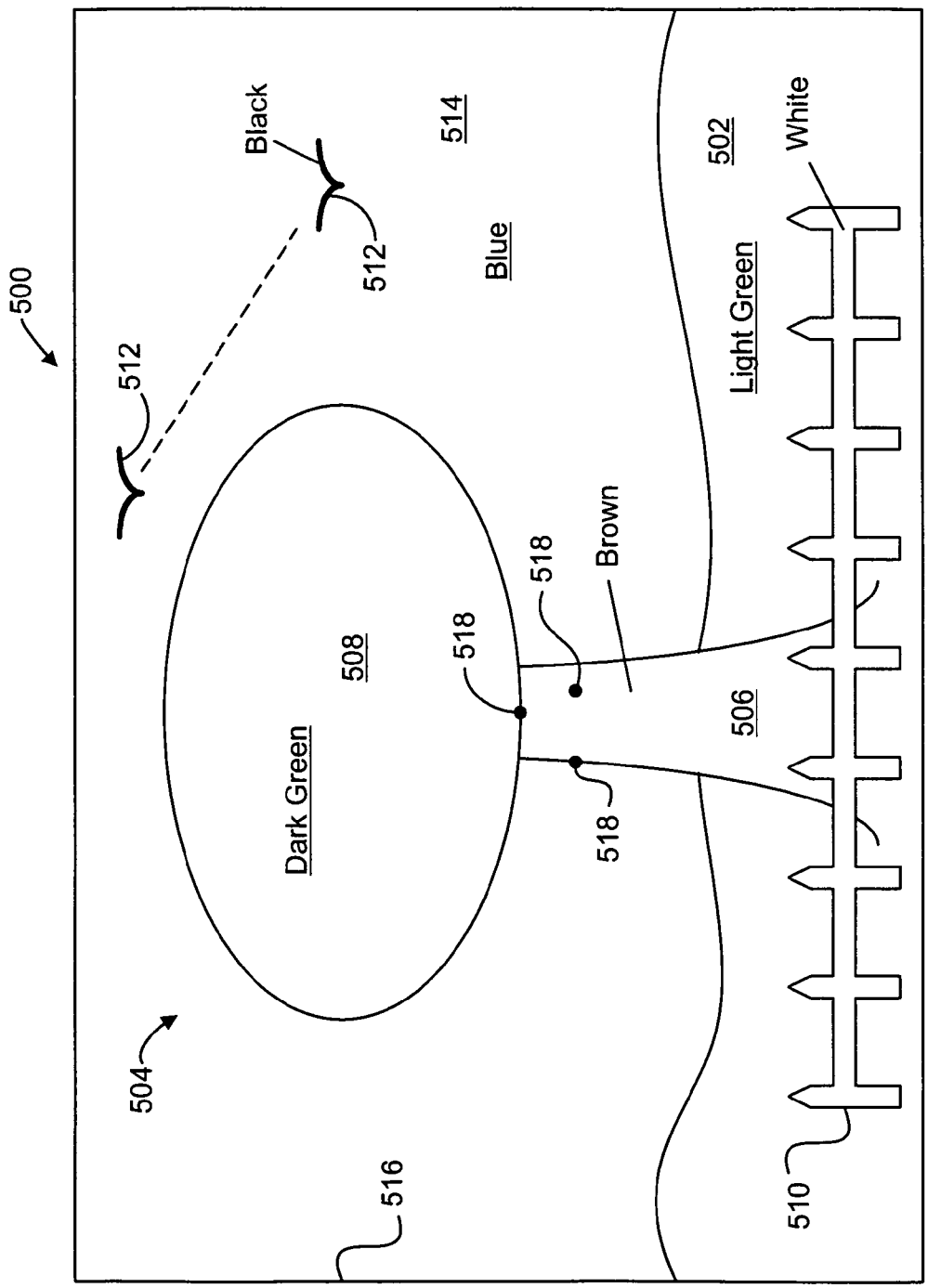
FIG. 5 illustrates an example observed scene.

FIG. 5 is an illustration of an observed scene 500 that will be used as an example to explain the detailed operation of the RICX 118 processing. Scene 500 includes a light green grassy hill 502 and a tree 504. Tree 504 includes a brown trunk 506 and a dark green leafy portion 508. Scene 500 further includes a white picket fence 510 extending in front of hill 502 and tree 504. A black bird 512 is also shown in motion flying in a blue sky 514. The entire scene 500 is bounded by a visual field boundary 516.

FIG. 6 is a flowchart summarizing a method 600 of providing sense perception in an electronic system. In a first step 602 a plurality of sensor data sets are captured from different perspectives for a scene. In the example embodiment, sensors sense the world at approximately 3 saccades per second on a continuous basis. Sensor movement, the direction the sensors are pointed, their focal distance, and so on is determined by a simulated motor cortex located in sensor interface 114. Sensor output may consist of, for example, one or more vectors for each pixel, consisting of properties such as RGB colors, intensity, contrast, and so on as output by driver software, and each property has an associated measurement value, hence the vector format. Sensor output is sent to the first level of the RICX system.

The example scene of FIG. 5 is what might appear in a single saccade as sensed by a Charged Couple Device (CCD) typically found in digital cameras, and other digital sensors would record sound, touch, smell, and so on. Note that FIG. 5 includes three fixation points 518 (e.g., the central pixel of the array). The three fixation points 518 are intended to represent the location of the fixation point for three successive images (saccades). The fixation points change during this process by slight movements of the sensors as is the case with saccades in real animals, as well as there counterparts for the other facets of reality.

Next, in a second step 604, invariants (elements that persist in the images) are identified in the scene data sets. Then, in a third step 606 objects are identified in the scene data as groups of the previously identified invariants. Next, in a fourth step 608, identified objects and invariants in the scene data sets are compared to objects and invariants from prior scene data sets to identify additional objects in the scene data sets. Finally, in a fifth step 610, data representations of the perceived objects and ungrouped invariants are output.

FIG. 7 is a flowchart summarizing a method 700 for performing the second step (identify invariants) of the method of FIG. 6. In a first step 702, the pixel offset for the data sets is determined. Second level 204 of RICX 118 accomplishes this by finding the central focus of the 3 saccade scenes (fixation points 518 in FIG. 5), and then using it to detect the off-set of the pixels for the 3 scenes being processed. By the "some but any" principle, the off-set must be some quantity, but may be any quantity within the context of the facet boundaries for the 3 scenes.

Next, in a second step 704, the pixels of the data sets are compared to determine differences and similarities. For example, second level 204 of RICX 118 uses the off-set to compare all the pixels in the scenes to detect their differences and measure similarities using subtraction of the corresponding pixels. In other words, measure the range of similarity for commensurable property—value pairs such as the color green, which can cover a range of RGB values, or light intensities, contrasts, and so on. For example, green pixels will differ less between each other even if they are different shades, than with blue, green, or white pixels, and so on.

Then, in a third step 706, pixels satisfying particular measurement ranges are grouped. For example, second level 204 of RICX 118 regards the pixels with commensurable properties as "units" in a group of pixels based on their inclusion in a measurement range (e.g.—the range for "green" or "bright" as opposed to "blue" or "dim"). This is possible because by the "some but any" principle, properties for these pixels must have some measurement value, but they could have any value in the range that has been measured to be typical for them within the context of the facets being processed (or remembered from past processing). This fact makes it possible to use a many-to-one relationship to integrate all the unitized pixels in the group into a single, new processing object, which is a first level invariant of color that is independent of the constantly changing data from which it is derived. So for example, in the scenes of FIG. 5, for any patch of color that your eyes integrate as a single unit (e.g., dark green leafy portion 508 or brown trunk 506 of tree 504, white picket fence 510, blue sky 514, etc.), this RICX 118 process would simulate that effect for a DLF robot.

Next, in a fourth step 708, sensation data is generated for the grouped pixels. For example, second level 204 of RICX 118 generates a simulated sensation of color based on the calculations for this invariant in the previous steps and stores all the measurement data in an IR-Pixel data structure, which is the new processing object. This "irregular" pixel structure encompasses and includes all the pixels (now regarded as units) in the group that is defined by their calculated measurement range. In the scene of FIG. 5, brown tree trunk and the white picket fence are now represented by separate IR-Pixels that now include all the ordinary pixels they respectively enclose, and each is henceforth processed as a single unit. Irregular shapes such as the dark green leaves 508 are processed the same way and also become IR-Pixels. At this point, sensations from other facets of reality that have been sensed and simultaneously integrated from sixels and tixels (sound and touch sensations, etc.) are added as additional property value pairs to the identity of the just formed simulated sensation. This means, for example, that the IR-Pixel for the green leaves 508 could have a "rustling sensation" as part of its identity as an additional property value pair that the picket fence 510 in the scene does not have. It is also important to note that the inclusion of the pixels into the IR-Pixel is a calculated certainty, not a probability, within the context of the 3 scenes used to calculate it. This fact differentiates RICX technology from state of the art approaches to sensing the world, approaches that use processes such as standard pattern recognition techniques or probability matrices.

Next, in a fifth step 710, it is determined whether all of the pixel data has been processed. If not, then method 700 returns to second step 704 to continue processing the remaining pixel data. When it is determined in fifth step 710 that all of the pixel data for the current three saccade data set has been processed, then method 700 proceeds to a sixth step 712.

In sixth step 712, the generated sensation data is output. In the example embodiment, sensation data is output by passing all three of the IR-Pixelated facets to the next level of RICX 118. The resulting data will reduce the number of units to be processed for each scene from thousands or millions of pixels to only about a few hundred or so IR-Pixels for most scenes.

FIG. 8 is a flowchart summarizing a method 800 for performing the third step (differentiate objects) of the method of FIG. 6. In the third level 206 RICX 118, the simulated sensations (color pattern invariants) are the IR-Pixels in the 3 saccade scenes just processed in second level 204 of RICX 118. The three scenes are then are processed again in a similar manner by comparing the IR-Pixels to resolve and identify simulated percepts of objects that may be present in the scenes as integrations of IR-Pixels using visual techniques and data from past processing that is stored in memory. Luckily, there are now fewer objects to process in this step in most cases because the IR-Pixels are integrations of the regular pixels, so this step will not take as much time. Instead of hundreds, thousands, or millions of pixels, there are many fewer IR-Pixels to be compared (perhaps as few as twenty to a few hundred depending on the content of the facets).

In a first step 802 of method 800, the pixel offset for the three saccade data sets is determined. In the example embodiment, the offset calculated by the previous level of RICX 118 is used, so there is no need to recalculate it. The offset is determined simply by receiving it with the IR-Pixel data.

Next, in a second step 804, the sensation data is compared to determine relative positions of the represented sensations. In the example embodiment, the third level 206 of RICX uses the pixel offset, the various scene analysis and perspective techniques described above, and a process of subtraction, to compare all the IR-Pixels to identify which ones may be in front of others, such as in figure-ground relationship. In other words, RICX 118 measures the range of similarity for various commensurable property—value pairs such as change with respect to background (from data in memory), or change in apparent distance from the sensors such as calculations based on stereoscopic sensor data and heard turning for sound data. For example, the location property measurements of IR-Pixels that are part of a farther away object will differ (relative to the context boundaries and perspective calculation set by the 3 saccade facets from two visual sensors spaced "eye distance" apart), whereas those of nearby IR-Pixels will not, and so on. RICX 118 uses the changes detected to calculate a distance vector and foreground-background position.

Then, in a third step 806, sensation data is grouped based on shared properties and determined positions. In the disclosed example embodiment, RICX 118 regards the IR-Pixels that are in front of others based on the movement of an occluding edge or other indicators such as the horizon as a group of "units" based on their shared property and measurement value of depth position in the facets and so on. As with the corresponding step with IR-Pixels described above, this may be done again here based on the measurements, calculations, and the "some but any" principle, because while the IR-Pixels in the group have a specific depth location value in this facet of reality (a vector), they could have any value that is measured as typical (or remembered from previous calculations) for the depth of this object and depending on the motion of the observer (the DLF system). This fact makes it possible to use another kind of many-to-one relationship to integrate all the unitized IR-Pixels in the group into a single, new processing object: The data structure called an "O-Pixel," and it is a second level invariant in the RICX system.

Next, in a fourth step 808, object data is generated for the identified sensation groups in the scene. In the example embodiment, RICX 118 generates a simulated percept of an object and stores the IR-Pixels (the units in the group) into an O-Pixel, which is the invariant data structure for storing the data of simulated percepts of objects and of scenes as collections of objects. O-Pixels are another new data structure used for storing and processing object and scene data as a single processing object. Like IR-Pixels, their main advantage is processing unit economy. It is more efficient to process the O-Pixel as a single processing object, than to re-process all the IR-Pixels and CCD pixels that this integrated object contains (times 3 for the saccade facets). The O-Pixel invariant data structure encompasses and includes all the IR-Pixels (now regarded as units) in the group that is defined by their calculated measurement range. In the case of the tree leaves 508 in the scene above, the "rustling green leaves sensation" would now be included as part of its identity in the simulated percept of the tree 504, along with the sensation of the brown trunk 506. So the tree's identity would include information from both the visual and auditory facets of the plenum of reality. It is important to note that the inclusion of the IR-Pixels into the O-Pixel is a calculated certainty (not a probability) within the context of the 3 saccade facets used to calculate it. This fact differentiates RICX technology from state of the art approaches to sensing the world, approaches that use processes such as standard pattern recognition techniques or probability matrices.

Next, in a fifth step 810, it is determined whether all of the data has been processed. If not, then method 800 returns to third step 806 to continue processing the remaining data (e.g., potential groupings of IR-Pixels in the three saccade scenes). When it is determined in fifth step 810 that all of the pixel data for the current three saccade data set has been processed, then method 800 proceeds to a sixth step 812.

In sixth step 812, all object data and ungrouped sensation data are integrated into a single perceptual facet. For example, RICX 118 integrates the data into one scene of the O-Pixels and includes the remaining IR-Pixels that could not be resolved and identified as objects. This single combination facet of integrated IR-Pixels and O-Pixels is passed up to the next level 208 of 30. RICX 118 for further processing.

FIG. 9 is a flowchart summarizing a method 900 for performing the fourth step (compare identified objects and invariants) of the method of FIG. 6. In the disclosed embodiment a particular example of method 900 is performed in fourth level 208 of RICX 118. In particular, the input for the fourth level 208 of RICX 118 is the simulated percepts of objects as the O-Pixels (grouped sensations) and the remaining simulated sensations as the IR-Pixels (color patterns) that were calculated from the 3 saccade scenes just processed in the previous level. This latest simulated perceptual facet is now processed again in a similar manner by comparing it to several of the previously input scenes in order to resolve and identify more simulated percepts of objects that may be present in the scenes, but could not be resolved at that previous level. Additional integrations of IR-Pixels into O-Pixels may be possible using additional data from other sensed facets that could not be computed at the lower level context, temporal relationships such as motion that did not register at that level, additional analysis techniques based on the horizon or pressure from gravity or kinesthetics, and data from past processing that is stored in memory. Advantageously, there are now many fewer items to process, because most of the data points have already been integrated into either IR or O-Pixel invariants. Instead of hundreds, thousands, or millions of CCD pixels, there are many fewer IR-Pixels and O-Pixels to be compared (perhaps as few as two to a few hundred depending on the content of the scenes). Additional measurement data is also calculated and used in this method, including, but not limited to, temporal changes (over a longer period than a 1 second saccade), distance perspective from stereoscopic imaging with motion, figure-ground with motion and occluding edges, and the horizon.

Referring again to FIG. 9, method 900 includes a first step 902, the pixel offset for the data sets is determined. When the newest simulated perceptual facet is received as O-Pixels and unresolved IR-Pixels, the average of the previously calculated off-sets from the original saccade scenes is used as a basis for their comparison. These may need to be mathematically adjusted, but unless the facet content has dramatically changed, this technique will work. Next, in a second step 904, the data is reprocessed with inputs from other sensory facets including, but not limited to, touch, hearing, kinesthetics, and so on that may not have computed at the lower levels of processing.

Then, in a third step 906, ungrouped sensation data is compared to determine relative movement. In the example embodiment, RICX 118 uses the off-set, the various scene analysis techniques described above, and a process of subtraction, to compare all the remaining IR-Pixels to identify which ones may be moving together as a group, for example, or in front of others, such as in figure-ground and horizon relationship. In other words, RICX 118 measures the range of similarity for various commensurable property—value pairs such as change in location in the scene, or change with respect to background (which can cover a range of temporal values), or change in apparent distance from the sensors. For example, the location property measurements of IR-Pixels that are part of a moving object will differ continuously (relative to the context boundaries set by the scenes), whereas those of nearby stationary IR-Pixels will not, and so on. The changes detected are used to calculate a motion vector property.

Next, in a fourth step 908, sensation data exhibiting group movement are grouped. In the example embodiment, RICX 118 regards the remaining IR-Pixels that move together (have the same motion vector) or are in front of others as a group of "units" of a group based on their shared property and measurement value of motion or depth position in the scenes and so on. As with the corresponding step with IR-Pixels in previous levels, this may be done again here based on the measurements, calculations, and the "some but any" principle because while the IR-Pixels in the group have a specific motion measurement value (vector), they could have any value that is measured as typical (or remembered from previous calculations) for the motion of this object. This fact makes it possible to use a many-to-one relationship to integrate all the unitized IR-Pixels in the group into a single, new processing object: The invariant data structure called an O-Pixel, a structure that now contains all the available information from all the facets of reality that have been sensed. Note: that the O-Pixels that were calculated in previous steps can also be error checked at this point by using this same technique.

Next, in a fifth step 910, object data is generated for the grouped sensation data. In the example embodiment, RICX 118 generates a simulated percept of an object and stores the IR-Pixels (the units in the group) into an O-Pixel, which is the invariant data structure for storing the data of simulated percepts of objects and scenes of objects. As explained above, the O-Pixel data structure encompasses and includes all the IR-Pixels (now regarded as units) in the group that is defined by their calculated measurement range, and these may now be used by higher level processes as a single processing unit.

Next, in a sixth step 912, it is determined whether all of the pending data has been processed. If not, then method 900 returns to second step 904 to continue processing the remaining data. If all the data has been processed, method 900 proceeds to a seventh step 914.

In seventh step 914, all object data and any ungrouped sensation data is integrated into a single perceptual facet. In the example embodiment, RICX 118 integrates into one facet all of the O-Pixels and any remaining IR-Pixels that could not be resolved and identified as objects. Note that some IR-Pixels will never be integrated into O-Pixels. RICX then passes this single simulated percept combination facet of IR-Pixels and O-Pixels to DLF 116 for further processing.

FIG. 10 is a table summarizing the input and output of various levels of RICX 118. Note that in the table of FIG. 10, RICX level 1 corresponds to second level 204 of RICX 118. Similarly, RICX levels 2 and 3 in the table of FIG. 10 correspond to third level 206 and fourth level 208 of RICX 118, respectively.

The description of particular embodiments of the present invention is now complete. Many of the described features may be substituted, altered or omitted without departing from the scope of the invention. For example, additional processing levels can be added to the RICX architecture. As another example, new data structures can be used for other types of sensory data. In addition, the particular details of algorithms for analyzing and integrating percepts in data sets for other types of sensory input will necessarily depend on the type of sensory input. These and other deviations from the particular embodiments shown will be apparent to those skilled in the art, particularly in view of the foregoing disclosure.

I claim:

1. A method of providing sense perception to an electronic system, said method comprising:
    capturing a plurality of data sets, each data set representing an observation from a different perspective;
    comparing said data sets to one another to identify invariants in said data sets;
    comparing said invariants of said data sets to identify objects including said invariants;
    comparing said identified invariants and objects to other invariants and objects identified in another plurality of data sets to identify additional objects including invariants not yet included in previously identified objects; and
    outputting data indicative of said identified objects and invariants.

2. The method of claim 1, wherein said different perspectives are temporal.

3. The method of claim 1, wherein said different perspectives are positional.

4. The method of claim 1, wherein said data sets include data indicative of optical images.

5. The method of claim 4, wherein said data sets include data indicative of sound.

6. The method of claim 1, wherein said data sets include data indicative of sound.

7. The method of claim 1, wherein said data sets include data indicative of at least three different types of sense perceptions.

8. The method of claim 1, wherein said step of comparing said data sets to one another to identify said invariants includes:
    determining the difference in perspective of said data sets;
    comparing the data sets using the difference in perspective to determine differences and/or similarities;
    grouping particular data satisfying one or more predetermined measurement ranges; and
    generating sensation data indicative of said grouped data to represent said invariants.

9. The method of claim 1, wherein said step of identifying objects including said invariants includes:
    determining the difference in perspective of said data sets;
    comparing said invariants to determine relative position;
    grouping said invariants based on relative position; and
    generating object data indicative of said grouped invariants to represent perceived objects.

10. The method of claim 9, further comprising integrating all object data and any ungrouped sensation data into a single data structure representative of the observation.

11. The method of claim 1, wherein said step of comparing said identified invariants and objects to other invariants and objects identified in another plurality of data sets includes:
    determining the difference in perspective between said plurality of data sets and said another plurality of data sets;
    comparing ungrouped invariants of said plurality of data sets with said ungrouped invariants of said another plurality of data sets to determine relative movement of said ungrouped invariants;
    grouping any of said ungrouped invariants that exhibit group movement; and
    generating object data indicative of said grouped invariants that exhibit group movement to represent perceived moving objects.

12. The method of claim 11, further comprising integrating all object data and any ungrouped invariants into a single data structure representative of the observation.

13. The method of claim 1, wherein said invariants include color patches in an optical image represented by said data sets.

14. A computer-readable storage medium having code embodied therein for causing a computer to perform a method of providing sense perception to an electronic system, said method comprising:
    capturing a plurality of data sets, each data set representing an observation from a different perspective;
    comparing said data sets to one another to identify invariants in said data sets;
    comparing said invariants of said data sets to identify objects including said invariants;
    comparing said identified invariants and objects to other invariants and objects identified in another plurality of data sets to identify additional objects including invariants not yet included in previously identified objects; and
    outputting data indicative of said identified objects and invariants.

15. The computer-readable storage medium of claim 14, wherein said different perspectives are temporal.

16. The computer-readable storage medium of claim 14, wherein said different perspectives are positional.

17. The computer-readable storage medium of claim 14, wherein said data sets include data indicative of optical images.

18. The computer-readable storage medium of claim 17, wherein said data sets include data indicative of sound.

19. The computer-readable storage medium of claim 14, wherein said data sets include data indicative of sound.

20. The computer-readable storage medium of claim 14, wherein said data sets include data indicative of at least three different types of sense perceptions.

21. The computer-readable storage medium of claim 14, wherein said step of comparing said data sets to one another to identify said invariants includes:
    determining the difference in perspective of said data sets;
    comparing the data sets using the difference in perspective to determine differences and/or similarities;
    grouping particular data satisfying one or more predetermined measurement ranges; and
    generating sensation data indicative of said grouped data to represent said invariants.

22. The computer-readable storage medium of claim 14, wherein said step of identifying objects including said invariants includes:
    determining the difference in perspective of said data sets;
    comparing said invariants to determine relative position;
    grouping said invariants based on relative position; and
    generating object data indicative of said grouped invariants to represent perceived objects.

23. The computer-readable storage medium of claim 22, wherein said method further comprises integrating all object data and any ungrouped sensation data into a single data structure representative of the observation.

24. The computer-readable storage medium of claim 14, wherein said step of comparing said identified invariants and objects to other invariants and objects identified in another plurality of data sets includes:
   determining the difference in perspective between said plurality of data sets and said another plurality of data sets;
   comparing ungrouped invariants of said plurality of data sets with said ungrouped invariants of said another plurality of data sets to determine relative movement of said ungrouped invariants;
   grouping any of said ungrouped invariants that exhibit group movement; and
   generating object data indicative of said grouped invariants that exhibit group movement to represent perceived moving objects.

25. The computer-readable storage medium of claim 24, wherein said method further includes integrating all object data and any ungrouped invariants into a single data structure representative of the observation.

26. The computer-readable storage medium of claim 14, wherein said invariants include color patches in an optical image represented by said data sets.

27. A system comprising:
   a sensor set;
   a sensor interface operative to communicate with said sensor set to capture a plurality of data sets, each data set representing an observation from a different perspective; and
   a processing unit for processing data and code, said code including a sense perception routine operative to compare said data sets to one another to identify invariants in said data sets, to compare said invariants of said data sets to identify objects including said invariants, to compare said identified invariants and objects to other invariants and objects identified in another plurality of data sets to identify additional objects including invariants not yet included in previously identified objects, and to provide data indicative of said identified objects and invariants.

28. The system of claim 27, wherein said different perspectives are temporal.

29. The system of claim 27, wherein said different perspectives are positional.

30. The system of claim 27, wherein said sensor set includes an optical sensor.

31. The system of claim 30, wherein said sensor set includes an acoustical sensor.

32. The system of claim 27, wherein said sensor set includes an acoustical sensor.

33. The system of claim 27, wherein:
   said sensor set includes at least three different types of sensors; and
   said data sets include data indicative of at least three different types of sense perceptions.

34. The system of claim 27, wherein said sense perception routine is operative to:
   determine the difference in perspective of said data sets;
   compare the data sets using the difference in perspective to determine differences and/or similarities in said data sets;
   group particular data satisfying one or more predetermined measurement ranges; and
   generate sensation data indicative of said grouped data to represent said invariants.

35. The system of claim 27, wherein said sense perception routine is operative to:
   determine the difference in perspective of said data sets;
   compare said invariants to determine relative position;
   group said invariants based on relative position; and
   generate object data based on said grouped invariants to represent perceived objects.

36. The system of claim 35, wherein said sense perception routine is further operative to integrate all object data and any ungrouped sensation data into a single data structure representative of said observation.

37. The system of claim 27, wherein said sense perception routine is operative to:
   determine the difference in perspective between said plurality of data sets and said another plurality of data sets;
   compare ungrouped invariants of said plurality of data sets with said ungrouped invariants of said another plurality of data sets to determine relative movement of said ungrouped invariants;
   group any of said ungrouped invariants that exhibit group movement; and
   generate object data indicative of said grouped invariants that exhibit group movement to represent perceived moving objects.

38. The system of claim 37, wherein said sense perception routine is further operative to integrate all object data and any ungrouped invariants into a single data structure representative of the observation.

39. The system of claim 27, wherein said invariants include color patches in an optical image represented by said data sets.

* * * * *